F. KRAMER.
DRAG HARROW.
APPLICATION FILED MAR. 12, 1914.
1,141,467.
Patented June 1, 1915.
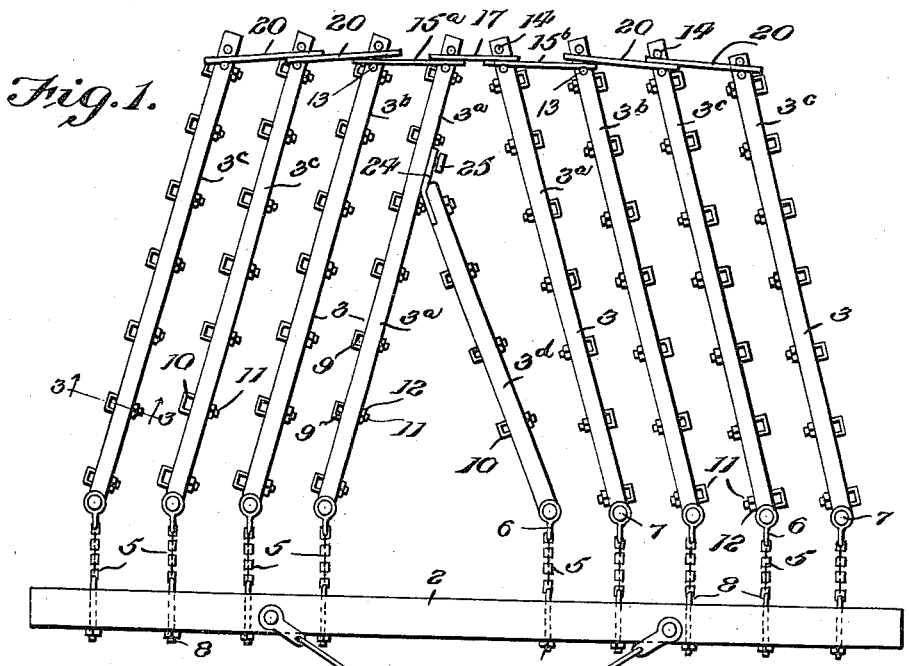
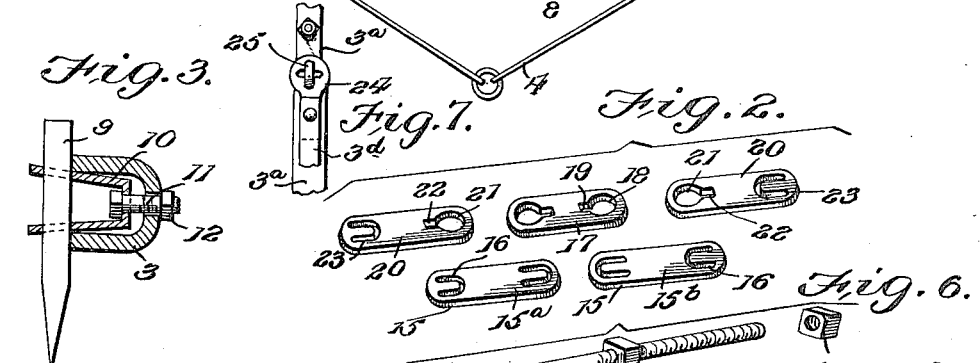
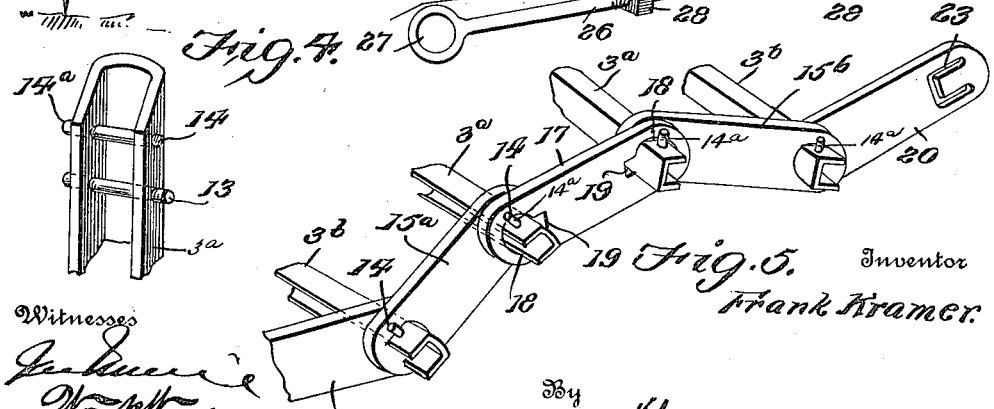
Inventor
Frank Kramer.

UNITED STATES PATENT OFFICE.

FRANK KRAMER, OF TISKILWA, ILLINOIS.

DRAG-HARROW.

1,141,467.      Specification of Letters Patent.      Patented June 1, 1915.

Application filed March 12, 1914. Serial No. 824,236.

*To all whom it may concern:*

Be it known that I, FRANK KRAMER, citizen of the United States, residing at Tiskilwa, in the county of Bureau and State of Illinois, have invented certain new and useful Improvements in Drag-Harrows, of which the following is a specification.

This invention relates to drag harrows and has as its object to provide a harrow of this type which will be more or less flexible so that as it is drawn over the ground the low places will be harrowed as well as the higher places.

More specifically, the invention aims to provide, in a harrow of this class including a number of tooth bars connected to a draft beam, novel means for connecting the rear ends of the bars so that the bars may have relative movement as they are drawn over uneven ground surface, and incidentally, it is a further aim of the invention to so construct the connecting means that the bars will be prevented from overturning and will at all times be held in such position that their teeth may properly act upon the surface being harrowed.

It is another aim of the invention to provide means for connecting the tooth bars to the draft beam and for connecting the rear ends of the tooth bars to each other, which means will permit of the ready disassemblage of the several elements of the harrow so that the same may be carried in small space and be lifted into and out of a wagon by one man.

Another object of the invention is to provide means for the addition or removal of a greater or less number of tooth bars, so as to increase or decrease the width of the harrow.

Other objects will appear in the course of the following description.

In the accompanying drawings:—Figure 1 is a top plan view of a harrow constructed in accordance with my invention. Fig. 2 is a group perspective view illustrating the several forms of links used for the purpose of connecting the rear ends of the tooth bars. Fig. 3 is a vertical section on the line 3—3 of Fig. 1. Fig. 4 is a detail perspective view of the rear end of one of the tooth bars. Fig. 5 is a fragmentary perspective view of the rear ends of the tooth bars showing the several links connecting said tooth bars and the position which these links permit the tooth bars to occupy. Fig. 6 is a perspective view of a modified form of link. Fig. 7 is a fragmentary side elevation of the connection between one of the middle tooth bars and the intermediate tooth bar.

Corresponding and like parts are referred to in the following description and indicated in all the views of the accompanying drawings by the same reference characters.

Referring to the drawings, and particularly to Fig. 1, 2 designates the draft beam of the harrow and 4 any suitable draft connection whereby a team may be hitched to the harrow. Extending rearward from the draft beam are a plurality of draft bars 3 which are connected by flexible connections 5 to the draft beam 2. Each of these bars 3, as illustrated, in Fig. 3, is U-shaped in cross section and in the embodiment of my invention illustrated, the flexible connections 5 consist of chains, the rear end of each chain being formed with a clevis 6 which engages over the forward end of the adjacent tooth bar and is connected thereto by a vertical bolt 7 or in any other suitable manner. The forward end of each chain is provided with a bolt 8 which passes through the draft beam, and thus the tooth bars are flexibly connected to the draft beam.

The teeth 9 are held to the tooth bars as shown in Fig. 3. Disposed within each tooth bar, at the point where a tooth is to be applied, is a U-shaped clip 10 which is perforated for the passage of the tooth 9. The clip 10 extends beyond the side walls of the U-shaped tooth bar so as to permit the passage of the tooth 9 transverse to the edges of the upper and lower walls of the tooth bar. Each clip is connected to the respective tooth bar by a bolt 11, the head of which bolt is engaged with the clip and passes through the clip and also through the inner face of the tooth bar.

A nut 12 is provided which permits the bolt 11 to be retracted, thereby drawing inward on the clip 10 and clamping the tooth firmly to the tooth bar. By releasing the nut 12 it is obvious that the clamping action on the tooth will be relased and the tooth may be readily withdrawn. It will be seen that this arrangement holds the teeth rigidly in place against any movement away from or parallel to the tooth-bar.

The rear end of each tooth bar 3, as illustrated in Fig. 4, is provided with the spaced transversely extending pins 13 and 14. The pin 13 passes through the upper and lower walls of the tooth bar and projects equidistantly on both sides thereof. The pin 14 however, which is nearest the extremity of the bar passes through these upper and lower walls but only projects beyond one of the walls, as shown in Fig. 5.

The rear ends of the tooth bars are connected by means of the links shown in Fig. 2. In order to differentiate between the several tooth bars I have designated the two middle tooth bars of the harrow as $3^a$, each next adjacent tooth bar $3^b$ and the tooth bar disposed laterally to each tooth bar $3^b$ as $3^c$. The tooth bars $3^a$ and $3^b$ at each side of the line of draft of the harrow are rigidly connected to each other at their rear ends in spaced relation and held from turning movement by links 15, one of which links is specifically indicated by the numeral $15^a$ and another by the numeral $15^b$. The only difference between these links is that the link $15^a$ is formed with U-shaped slots 16, both of which extend in the same direction, the U-shaped slots of the link $15^a$ being reversely disposed to the U-shaped slots of the link $15^b$, it being understood that the tooth bars on the left-hand side of the draft line open toward the left, while the tooth bars on the right-hand side of the draft line open toward the right.

The bars $3^a$ are rigidly connected with the corresponding or adjacent bars $3^b$ by the links 15 which are slipped over the ends of the bars and which are locked in place by the pins 14. The bars $3^a$ disposed on each side of the middle or line of draft are connected to each other by means of the link 17 (see Fig. 2). This link 17 is formed at its opposite ends with circular openings 18 having a diameter sufficiently large to permit them to readily fit over the ends of the bars $3^a$. It will be noted that the wall of each of the perforations 18 is formed with a lateral notch 19. This notch is to permit the link to pass the projecting end $14^a$ of the pin 14 and permit the two lateral sections of the harrow to be connected to or disconnected from each other, as will later appear. The bars $3^c$ are connected to each other and also connected to the bars $3^b$ by means of links 20, shown in Fig. 2. Each of these links 20 is formed at one end with a circular opening 21 the wall of which is provided with a radially extending notch 22 and at its other end with a U-shaped slot 23. It will be seen that the U-shaped slot 23 of the links 20 designed to be used on one side of the line of draft are reversed relative to the U-shaped slots 23 of the links designed to be used for connecting the tooth bars at the other side of the harrow.

The object of the link 17, shown in Fig. 2 is to provide means for connecting the two sections of the harrow flexibly to each other and to provide for flexibly connecting the rear ends of the tooth bars to each other so that the bars may independently rise and fall to conform to the contour of the ground being harrowed, as shown in Fig. 5, and the object of forming U-shaped slots in links, as for instance the slots 23 and 16 is to prevent any overturning of the tooth-bars.

In connecting up the tooth-bars of the harrow the bars $3^a$ and $3^b$ are connected to each other by means of the links $15^a$ or $15^b$, thus the bars $3^a$ and $3^b$ of each pair are held rigidly with relation to each other. In order to make this connection the link 17 first turned to a vertical position so that the pin on one of the bars $3^a$ will slip through the notch 19 and then the opening in the other end of the links is slipped over the other bar $3^a$, the link being turned or the section so disposed that the pin 14 will slip through the notch 19. When the sections are disposed therefore, in a horizontal position it will be seen that the pins 14 will extend vertically while the notches 19 will be disposed horizontally, thus preventing the link 17 from being withdrawn from its engagement with the bars $3^a$. If now, it is desired to add additional tooth bars on one or both sides of the harrow, each additional tooth bar is passed through the U-shaped slot of one of the links 20 and the opposite end of this link is placed over the next adjacent tooth-bar, the link 20 being so turned that the pin 14 will pass through the notch 22. When these links 20 are again disposed in a horizontal position it will be obvious that the links will be locked to the bars. It will thus be seen that the outermost bars $3^c$ are flexibly connected to the next adjacent bars $3^c$; that these bars $3^c$ are flexibly connected to the bars $3^b$ and that the bars $3^b$ are rigidly connected to the adjacent bars $3^a$ and that these middle bars $3^a$ are in turn flexibly connected to each other.

In Fig. 1 there is also shown a middle bar designated $3^d$ which has exactly the same construction as any one of the tooth bars 3 and which is connected to the beam 2 by means of the chain 5, as heretofore described. The rear end of this bar $3^d$ abuts against one of the bars $3^a$ and is connected thereto by means illustrated in Fig. 7. To the extremity of the bar $3^d$ is attached an eye member 24 which eye is elongated in one direction and projecting from the bar $3^a$ is a stud or pin 25 having a horizontally elongated head. When the head and the eye 24 are turned so that the head alines with the longer axis of the opening through the eye the eye may be disposed over the head and then when the bar $3^d$ is brought to a horizontal position, the eye member will be locked to the stud 25.

It will now be apparent that when the bars are assembled and linked together in the manner above described, each bar will be prevented from overturning, although the bars may have relative movement with respect to each other. In other words, as the harrow is drawn over an uneven surface, the bars will ride into the depressions therein as well as over the more elevated portions thereof, and thus the harrow will conform to the contour of the ground being harrowed. It will be apparent, however, that inasmuch as the rear end of each of the tooth bars is fitted in one of the U-shaped slots in the corresponding links it cannot turn about its axis with respect to the link with which it is connected.

It will be apparent from the foregoing that when it is desired to disassemble the parts of the harrow the tooth bars and links may be rotated relatively to each other so as to disengage the links from the tooth bars, and the tooth bars may, of course, be readily disengaged from the beam 2.

If desired, a link arrangement such as shown in Fig. 6 of the drawings may also be used instead of the links 20. This figure shows a link 26 which consists of a rod screw threaded adjacent one end and formed with a circular eye 27 adjacent its other end. The screw-threaded end of the rod is to be passed through and bolted to the rear end of one of the tooth bars, such as the bar 3$^c$, while the eye 27 passes over and is loosely engaged with the rear end of the next adjacent bar, such as the bar 3$^b$. In this case, however, the pin 14 is removable and is replaced after the link has been engaged with the bar 3$^b$. It will, of course, be understood that the bolt is clamped to the bar to which it is attached by means of the nuts 28.

Having thus described the invention what is claimed as new is:

1. In a harrow of the class described, a draft beam, and a harrow section including tooth bars connected to the beam, and links connecting the ends of the tooth bars, the connection of each link with one of the tooth bars being rigid and with the next adjacent tooth bar being movable.

2. In a harrow of the class described, a draft beam, tooth bars connected to the beam, and links connecting the rear ends of the bars and having openings receiving the said ends of the bars, the walls of certain of the openings being notched and the adjacent end of the bars having studs arranged for passage through the notches when the links are turned to predetermined position to permit the removal thereof.

3. In a harrow of the class described, a draft beam, tooth bars flexibly connected to the beam and extending rearward therefrom, links fitting the rear ends of the bars and connecting the bars for relative movement in vertical planes, the links having openings to receive the rear ends of the related bars, one opening of each of certain of the links removably receiving the rear end of one bar and rotatably engaging the said end of said bar and the other opening non-rotatably receiving the end of the next adjacent bar.

4. A drag harrow of the character described including two pairs of tooth bars disposed one pair on each side of the line of draft, the bars of each pair being rigidly connected to each other, a connection between the adjacent bars of both pairs spacing said bars but permitting them to have relative movement in a vertical plane, and laterally disposed bars having links rotatably engaging the outer bars of the first named pairs of bars for movement in a vertical plane.

5. A drag harrow of the character described including a draft beam, a pair of tooth bars disposed one on each side of the line of draft, flexibly connected to the draft beam and extending rearward therefrom in convergent relation, a link having rotatable engagement with the rear ends of both of said bars, bars extending parallel to the first-named bars and rigidly connected thereto, and bars extending parallel to the second named bars and connected thereto for free relative movement in a vertical plane, all of said bars being flexibly connected to the draft beam, and an intermediate bar disposed between the first-named bars flexibly connected at its forward end to the draft beam and at its rear end detachably connected to one of the first-named bars.

6. In a harrow, a pair of parallel tooth bars, each of said bars being U-shaped in cross-section, each bar being formed with a transversely extending pin projecting at one end beyond the surface of said bar, and a link connecting said bars, one end of the link being rigidly connected to one of said bars, the other end of the link rotatably engaging the other bar inwardly of said pin.

7. In a harrow of the class described, a draft beam, tooth bars connected to the beam and arranged in series at each side of the draft line of the harrow, the beams of the two series converging in a rearward direction, and links connecting the ends of the tooth bars, the connection of each link with one of the bars being rigid and with the next adjacent tooth bar being movable, the said links constituting means for holding the bars against rotative movement but permitting of relative vertical movement of the bars.

8. In a harrow of the class described, a draft beam, tooth bars flexibly connected with the beam and arranged in series at opposite sides of the draft line of the harrow, means flexibly connecting the rear ends of the tooth bars, and an intermediate tooth bar located between the two first-mentioned tooth bars next adjacent the line of draft and flexibly connected at one end to the draft beam and removably connected at its other end to one of the said tooth bars between which it is located.

In testimony whereof I affix my signature in presence of two witnesses.

FRANK KRAMER. [L.S.]

Witnesses:
FRANK J. LILEAK,
LOUIS L. MAIN.

Copies of this patent may be obtained for five cents each, by addressing the "Commissioner of Patents, Washington, D. C."